(12) United States Patent
Doi et al.

(10) Patent No.: US 6,360,003 B1
(45) Date of Patent: *Mar. 19, 2002

(54) IMAGE PROCESSING APPARATUS

(75) Inventors: Miwako Doi, Kawasaki; Akira Morishita, Tokyo; Naoko Umeki; Yasunobu Yamauchi, both of Kawasaki; Shunichi Numazaki, Yokohama, all of (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/132,197

(22) Filed: Aug. 11, 1998

(30) Foreign Application Priority Data

Aug. 12, 1997 (JP) ............................................. 9-217746

(51) Int. Cl.[7] ................................................. G06K 9/00
(52) U.S. Cl. ....................................... 382/107; 382/103
(58) Field of Search ................................. 382/107, 254, 382/255, 274, 275, 286, 288, 299; 348/699

(56) References Cited

U.S. PATENT DOCUMENTS

| 4,496,995 | A | * | 1/1985 | Colles et al. ................. 386/68 |
|---|---|---|---|---|
| 4,939,369 | A | * | 7/1990 | Elabd .......................... 250/332 |
| 5,241,608 | A | * | 8/1993 | Fogel .......................... 382/107 |
| 5,361,105 | A | * | 11/1994 | Iu ............................... 348/699 |
| 5,485,897 | A | * | 1/1996 | Matsumoto et al. ........ 187/399 |
| 5,544,215 | A | * | 8/1996 | Shroy, Jr. et al. ........ 378/98.12 |
| 5,596,659 | A | * | 1/1997 | Normile et al. ............. 382/253 |
| 5,642,171 | A | * | 6/1997 | Baumgartner et al. ...... 348/515 |
| 5,657,077 | A | * | 8/1997 | DeAngelis et al. ......... 348/157 |
| 5,696,848 | A | * | 12/1997 | Patti et al. ................... 382/254 |
| 5,701,163 | A | * | 12/1997 | Richards et al. ............ 348/578 |
| 5,754,700 | A | * | 5/1998 | Kuzma ........................ 382/236 |
| 5,819,048 | A | * | 10/1998 | Okazaki et al. ............. 709/233 |
| 6,037,991 | A | * | 3/2000 | Thro et al. .................. 348/469 |

* cited by examiner

*Primary Examiner*—Andrew W. Johns
*Assistant Examiner*—Shervin Nakhjavan
(74) *Attorney, Agent, or Firm*—Oblon, Spivak, McClelland, Maier & Neustadt, P.C.

(57) ABSTRACT

When the computed velocity of barycenter of image data, acquired based on initial values of image capturing parameters, is greater than a specified value, an image capturing timing is set quicker than an initial value and a resolution of image data to be captured is reduced. When the velocity of barycenter is smaller than the specified value, the resolution of image data to be captured is set higher than an initial value and the image capturing timing is set slower than the initial value.

13 Claims, 10 Drawing Sheets

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 255 | 0 | 0 | 0 | 0 | 0 |
| 0 | 0 | 250 | 0 | 0 | 0 | 0 | 0 |
| 0 | 0 | 250 | 0 | 0 | 0 | 0 | 0 |
| 0 | 220 | 250 | 0 | 220 | 0 | 0 | 0 |
| 0 | 220 | 220 | 0 | 220 | 0 | 0 | 0 |
| 0 | 220 | 220 | 200 | 200 | 0 | 0 | 0 |
FIG. 4
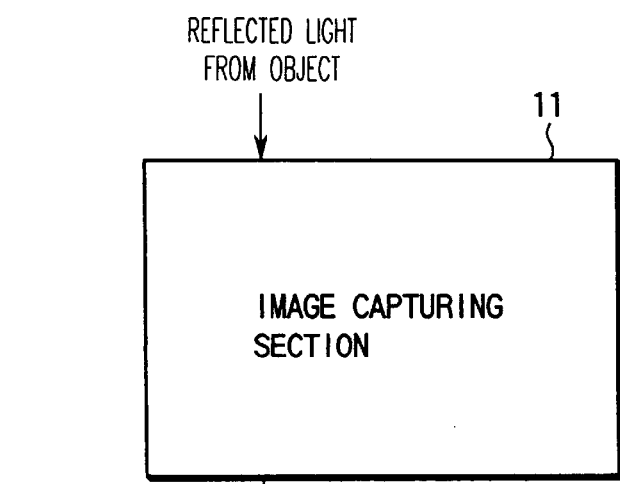
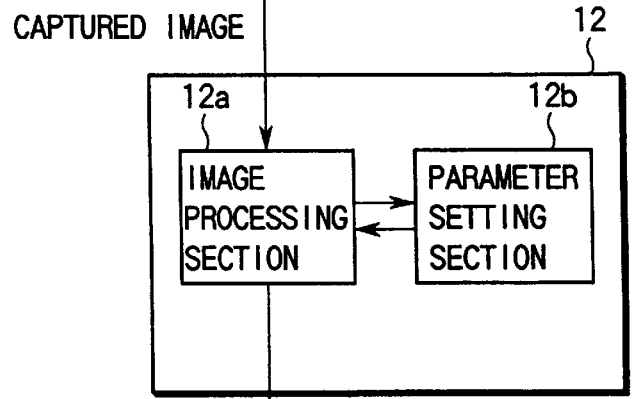
FIG. 5

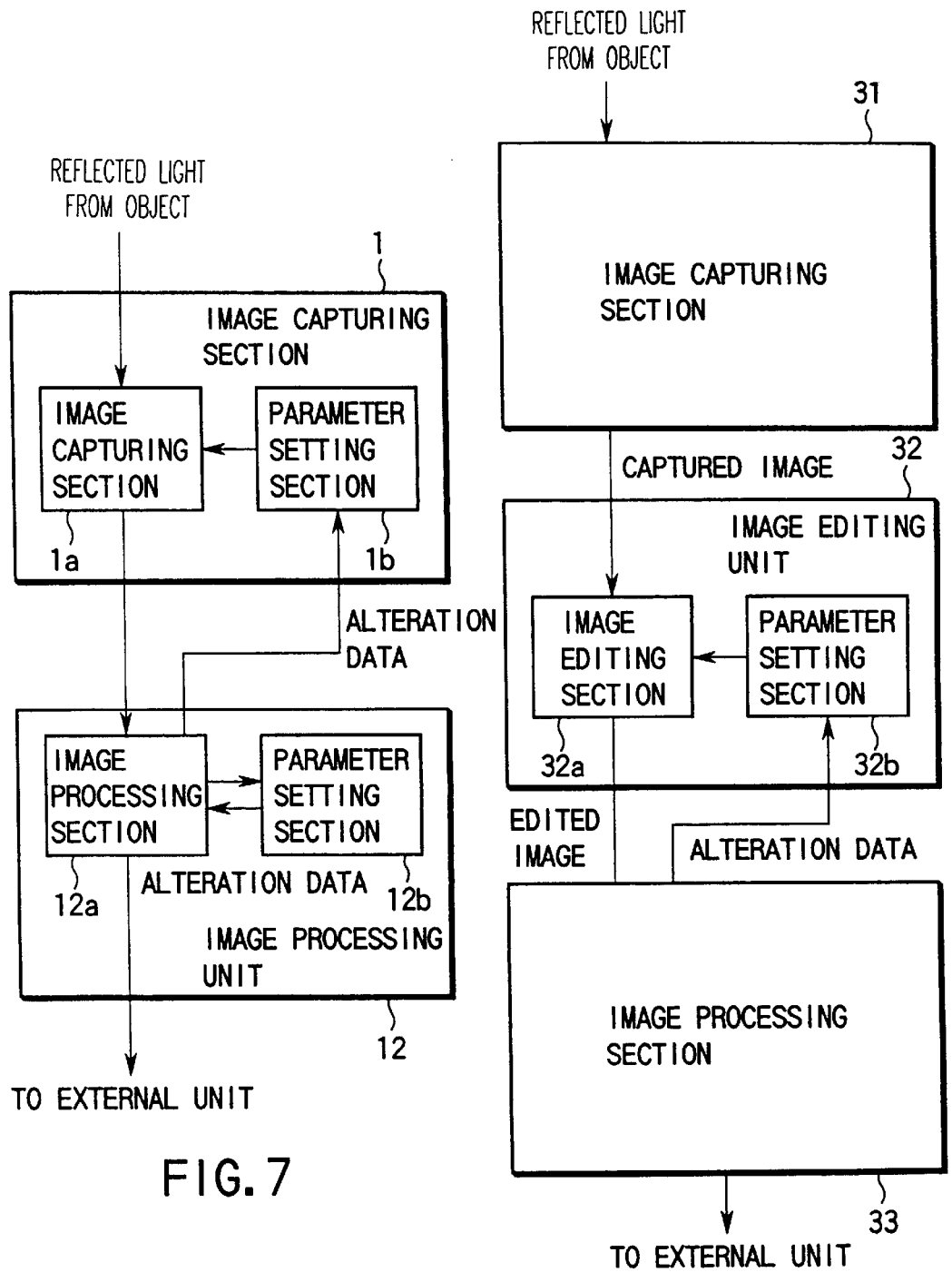

IMAGE PROCESSING APPARATUS

BACKGROUND OF THE INVENTION

This application is based on Japanese Patent Application No. 9-217746 filed Aug. 12, 1997, the content of which is incorporated herein by reference.

The present invention relates to an image processing apparatus which is connectable to an external unit, such as a personal computer or a game machine, and, like an existing mouse, is usable as an input device for such an external unit.

While a mouse is very popular as an input device for computers, the mouse only serves as a two-dimensional pointing device to implement operations, such as cursor movement and menu selection. The actual manipulation of the mouse should follow certain rules like double clicking of a mouse button, and is not intuitive. It is therefore difficult for old people to manipulate a mouse.

To solve this shortcoming, some studies have been made to realize an intuitive manipulation such that moving a hand rightward moves a cursor rightward on the screen. One of the studies concerns with recognition of a gesture or the like by means of image processing. For example, there is an ongoing study on analysis of a motion image like a video image to recognize the shape and motion of a hand. In a case of extracting a hand by using a color, for example, as the color of a hand is skin-colored, only an image area of the skin color can be extracted. If there are beige clothes or walls on the background, it is hard to distinguish a skin color. Even if beige can be distinguished from a skin color through some adjustment, the color tone changes when illumination is changed. It is thus difficult to always extract a hand. There is a scheme of computing motion vectors between frames to analyze an object in motion. In this case, no significant problem would arise if there are a small number of objects in motion. If many objects are in motion, however, the number of motion vectors is increased considerably. This increases the load on the computation of motion vectors between frames, making it extremely difficult or impossible to identify the motion of a target object.

In the conventional scheme of capturing image data using capturing means like a video camera and analyzing the image data, the analysis flow and information to be analyzed are fixed. When the characteristics of image data of a target object to be analyzed (e.g., the shape and motion of the target object and the conditions of the environment in which the object is present) changes with time, a burden is put on a specific processing section so that the analyzing process cannot follow up the change.

One way to solve this problem is the use of a high-performance computer or a fast transmission system to cope with image processing (e.g., processing of 30 images per second) in real time even if the load is increased. When the characteristics of image data of an objected to be analyzed do not vary significantly, however, this method cannot make the best use of a high-performance computer or a fast transmission system, resulting in a very poor cost performance.

In short, the conventional image processing system has a difficulty in implementing low-cost and robust analysis on image data of an objected to be analyzed in accordance with a variation in the characteristics of the image data. That is, robust analysis on image data of an objected to be analyzed in accordance with a variation in the characteristics of the image data requires a high-performance computer or a fast transmission system which leads to a cost increase that stands in the way of home use of the image processing system.

BRIEF SUMMARY OF THE INVENTION

Accordingly, it is an object of the present invention to provide an image processing apparatus which can accurately analyze and recognize the motion of a target object to be analyzed without making a sacrifice of the process response time in response to even a large variation in the characteristics of image data of the target object.

An image processing apparatus according to this invention comprises image capturing means for capturing image data based on image capturing parameters for determining an image capturing operation; image processing means for performing predetermined image processing on the image data captured by the image capturing means; and alteration means for altering the image capturing parameters based on characteristics computed by the image processing means. This structure makes it possible to accurately analyze and recognize the motion of a target object to be analyzed without making a sacrifice of the process response time in response to even a large variation in the characteristics of image data of the target object.

An image processing apparatus embodying this invention comprises image capturing means for capturing image data; image processing means for performing predetermined image processing on the image data, captured by the image capturing means, based on image processing parameters for determining an image processing operation; and alteration means for altering the image processing parameters based on characteristics computed by the image processing means. With this structure, it is possible to accurately analyze and recognize the motion of a target object to be analyzed without making a sacrifice of the process response time in response to even a large variation in the characteristics of image data of the target object.

An image processing apparatus according to this invention comprises image capturing means for capturing image data based on image capturing parameters for determining an image capturing operation; image processing means for performing predetermined image processing on the image data, captured by the image capturing means, based on image processing parameters for determining an image processing operation; and alteration means for altering at least one of the image capturing parameters and the image processing parameters based on characteristics computed by the image processing means. This structure makes it possible to accurately analyze and recognize the motion of a target object to be analyzed without making a sacrifice of the process response time in response to even a large variation in the characteristics of image data of the target object.

An image processing apparatus embodying this invention comprises image capturing means for capturing image data; image editing means for editing the image data, captured by the image capturing means, based on image editing parameters for determining an image editing operation; image processing means for performing predetermined image processing on the image data, edited by the image editing means; and alteration means for altering the image editing parameters based on characteristics computed by the image processing means. This structure makes it possible to accurately analyze and recognize the motion of a target object to be analyzed without making a sacrifice of the process response time in response to even a large variation in the characteristics of image data of the target object.

An image processing apparatus according to the invention comprises image capturing means for capturing image data based on image capturing parameters for determining an image capturing operation; image editing means for editing the image data, captured by the image capturing means, based on image editing parameters for determining an image editing operation; image processing means for performing predetermined image processing on the image data, edited by the image editing means, based on image processing parameters for determining an image processing operation; and alteration means for altering at least one of the image capturing parameters, the image editing parameters and the image processing parameters based on characteristics computed by the image processing means. With this structure, it is possible to accurately analyze and recognize the motion of a target object to be analyzed without making a sacrifice of the process response time in response to even a large variation in the characteristics of image data of the target object.

An image processing apparatus according to this invention comprises image capturing means for capturing image data; image editing means for editing the image data, captured by the image capturing means, based on image editing parameters for determining an image editing operation; image processing means for performing predetermined image processing on the image data, edited by the image editing means based on image processing parameters for determining an image processing operation; and alteration means for altering at least one of the image editing parameters and the image processing parameters based on characteristics computed by the image processing means. With this structure, it is possible to accurately analyze and recognize the motion of a target object to be analyzed without making a sacrifice of the process response time in response to even a large variation in the characteristics of image data of the target object.

This invention can accurately analyze and recognize the motion of a target object to be analyzed without making a sacrifice of the process response time in response to even a large variation in the characteristics of image data of the target object.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description, given above and the detailed description of the preferred embodiments given below, serve to explain the principles of the invention.

FIG. 4 is a diagram showing a specific example of a captured image;

FIG. 5 is a diagram schematically exemplifying the structure of an image processing apparatus according to a second embodiment of this invention;

FIG. 7 is a diagram schematically exemplifying the structure of an image processing apparatus according to a third embodiment of this invention;

FIG. 8 is a diagram schematically exemplifying the structure of an image processing apparatus according to a fourth embodiment of this invention;

DETAILED DESCRIPTION OF THE INVENTION

Preferred embodiments of the present invention will now be described with reference to the accompanying drawings.

First Embodiment

Figure 1:
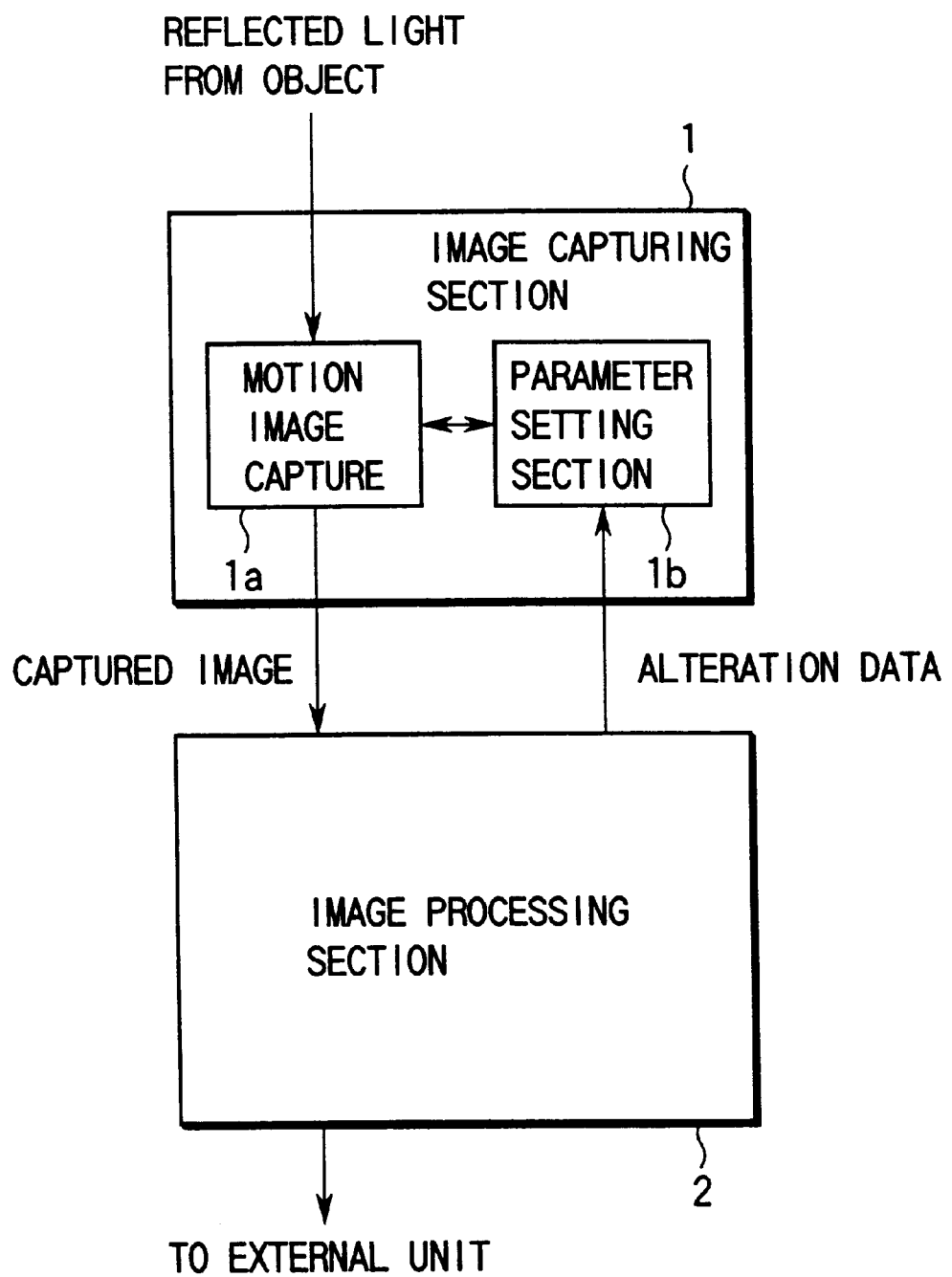
FIG. 1 is a diagram schematically exemplifying the structure of an image processing apparatus according to a first embodiment of this invention.

FIG. 1 schematically exemplifies the structure of an image processing apparatus according to the first embodiment of this invention. This image processing apparatus comprises an image capturing section 1, constituted of, for example, a CCD camera or CMOS camera, and an image processing section 2, which analyzes image data (captured image data) captured by the image capturing section 1, and computes the barycenter, the area, the velocity of barycenter, etc. of a captured object, based on a density distribution, color histogram and so forth.

The image capturing section 1 essentially comprises a motion image capture 1a and a parameter setting section 1b. The motion image capture 1a is constituted of motion image capturing means, such as a CCD camera or CMOS camera, for capturing image data of an object to be processed (hereinafter sometimes referred to as "target object"). The parameter setting section 1b sets parameters at the time of capturing image data by means of the motion image capture 1a, or image capturing parameters such as the image capturing timing, the resolution of image data to be captured and a captured region (motion captured region) for designing the entire capturing range capturable by the motion image capture 1a or a specific regional range in the entire capturing range. The parameter setting section 1b alters the image capturing parameters based on alteration data output from the image processing section 2.

The image processing section 2, when connected to an external unit such as a personal computer or a game machine, can be used as an input device like an existing mouse for such an external unit. The analysis result and captured image data, which are output from the image processing section 2, are sent to the external unit. The image processing section 2 has an ability to convert image data to data of a predetermined output format (e.g., X and Y coordinates data) and output the resultant data.

Referring now to flowcharts illustrated in FIGS. 2 and 3, the operation of the image processing apparatus in FIG. 1 will be discussed. Before starting the operation, the parameter setting section 1b initializes image capturing parameters (step S1). For example, an image capturing timing 1/f Hz (f: the number of frames of image data to be captured per second) is set to f=30. This value is the same as the frame number of an ordinary video movie. A resolution R (the number of pixels to be captured per frame) is set to 256×256 (pixels). An capture area A is set to the entire capturable range (all).

Based on those initial values, the motion image capture 1a starts capturing image data (step S2). The image data captured (captured image data) is output to the image processing section 2 in a form as shown in FIG. 4.

FIG. 4 depicts part of captured image data (8×8 pixels, part of the captured image data with a transmission of 256×256). In this example, the pixel values in rows indicate the acquired intensities of reflected light in eight bits. The pixel with a value of "255" is closest to the image capturing section 1, while the pixel with a value of "0" is so far from the image capturing section 1 that the reflected light does not reach the image capturing section 1.

The image processing section 2 analyzes captured image data output from the image capturing section 1, and computes characteristics, such as the barycenter of captured image data of an object (e.g., a human hand) to be processed, the area thereof, the velocity of barycenter (step S3). As this analysis scheme is the same as that of the conventional image processing and is well known, its description will not be given. Based on the characteristics computed in step S3, a sequence of processes starting at step S4 is a determining process for altering the image capturing parameters.

The velocity of barycenter v is compared with a specified value V0 (with one screen whose sides have lengths of 30 cm, for example, V0+30 cm×f(+30)=900 cm/sec which is approximately 10 m/sec) (step S4). When the velocity of barycenter v is greater than the specified value V0, it can be considered that the hand or the target object is moving too fast for the image processing of the image processing section 2 to follow up the motion of the hand at a rate of 30 frames per second. In this case, the parameter setting section 1b of the image capturing section 1 is allowed to perform a process of setting the image capturing timing faster (steps S5 and S6). In accordance with the rate of 60 frames per second which is the normal acquisition rate for games, the frame number f of image data to be captured per second is altered to 60, updating the image capturing timing in step S6.

Alteration of the number of frames to be captured per second from 30 to 60 means that the amount of image data to be captured per second becomes double. This would increase the amount of processing, if no measure to avoid it is taken, making real-time processing difficult to accomplish. In step S6, therefore, the resolution of image data to be captured is reduced in an inverse proportion to the alteration of the image capturing timing. In this example, the resolution R originally of 256×256 is reduced to 128×128. Manipulation with a fast moving hand implies that a fast action is important and the shape of the hand is not so significant, so that lowering the resolution will not interfere with recognition and discrimination of an instructional manipulation which is effected by a user moving his or her hand. Actually, the process of recognizing the motion of the user's hand can be implemented in response to the motion of the user's hand, so that a process response time to the instructional manipulation effected by the motion of the user's hand can be prevented from becoming slower.

When the parameter setting section 1b sets the parameters (image capturing timing and resolution) that permit following up of the fast hand motion based on parameter alteration data sent from the image processing section 2 in step S6, the parameter setting section 1b returns to step S2 to continue the image capturing operation. When the flow comes to step S4 again, the image capturing timing f has already been set to "60," so that it is redundant to repeat the same setting in step S6. To avoid this redundancy, it is determined in step S5 if f has already been set to the fast image capturing timing. When the setting has been completed, the flow skips step S6 and returns to step S2 to resume the image capturing operation.

The image capturing timing and resolution are changed in this way in step S4 to S6 in such a way as to be able to effect image capturing when a hand is moving faster than normal.

When a hand is moving slower than the normal speed or is hardly moving, it is efficient to increase the resolution of captured image data and perform a process which has emphasis on recognition of the shape of the hand. A determining process for this case is illustrated in steps S7 to S9.

The velocity of barycenter v is compared with a specified value V1 (for example, 10 cm/sec). When the velocity of barycenter v is lower than the specified value V1, it can be considered that the motion of the hand or the target object is slow (it may be considered that the user wants a direct manipulation based on the shape of the hand, like sign language). In this case, the parameter setting section 1b of the image capturing section 1 is permitted to carry out a process of altering the resolution R to such a high resolution as to ensure shape recognition with high precision (steps S8 and S9). For instance, the resolution R is changed to 512×512 from 256×256. This high resolution increases the amount of captured image data by a factor of four, increasing the amount of processing. This makes real-time processing difficult to implement. In step S9, therefore, the number of frames f to be captured per second is reduced to 15 from the ordinary number of 30 to limit the increase in the entire amount of processing to a double. This alteration can permit a real-time response to the instructional manipulation that is based on the shape of the user's hand.

When the parameter setting section 1b sets the parameters (image capturing timing and resolution) that ensure fast and accurate recognition of the shape of the hand in step S9, the parameter setting section 1b returns to step S2 to resume the image capturing operation. When the flow comes to step S7 again, the image capturing timing f has already been set to "15," so that it is redundant to repeat the same setting in step S9. To avoid this redundancy, it is determined in step S8 if f has already been set to the slow image capturing timing. When the setting has been completed, the flow skips step S9 and returns to step S2 to resume the image capturing operation.

The foregoing description has been given of a case where the image capturing operation of the image capturing section 1 is switched between a fast mode and a slow mode depending on whether the motion of an object to be processed is fast or slow. Likewise, the image capturing operation of the image capturing section 1 can be switched to a normal mode. A determining process for this case is illustrated in steps S10 to S12 in FIG. 3.

The velocity of barycenter v is compared with the specified values V0 and V1. When the velocity of barycenter v lies between the specified values V0 and V1 (step S10) and when the image capturing timing f of the image capturing section 1 is "30," the flow returns to step S2 to resume the image capturing operation (step S11). When the image capturing timing f is not "30," it is set back to the initial value of "30" and the resolution R is also set back to the initial value of "256×256" after which the image capturing operation is resumed (step S12).

A description will now be given of alteration of a captured region (motion captured region). The area s of the region of an object to be processed in the captured image data is compared with a specified value S0 of a predetermined area with respect to the area of the captured image data, and the image capturing timing f of the captured image data is compared with "15," the value of the image capturing timing when the motion of the target object is slow (step S13). When the area s of the region of the target object is smaller than the specified value SO and the value of the image capturing timing f is "15," it can be considered that the ratio of the target object to the entire captured image data is so small as to make it difficult to accurately recognize the shape, motion and so forth of the object and that the motion of the target object is slow. At this time, the captured region is limited to increase the efficiencies of recognition and image capturing of the target object (step S15). That is, a captured region A is set smaller than the current captured region (limited). When the captured region A has already become a limited region, the flow skips step S15 and returns to step S2 to resume the image capturing operation (step S14).

The area s of the region of the object to be processed in the captured image data is compared with a specified value S1 of a predetermined area with respect to the area of the captured image data, and the image capturing timing f of the captured image data is compared with "15," the value of the image capturing timing when the motion of the target object is slow (step S16). When the area s of the region of the target object is larger than the specified value S1 (S1 is a value set to four times the value of S0 when the motion captured region with the captured region A being limited is, for example, ¼ of the capturable region) and the value of the image capturing timing f is not "15," it can be considered that the ratio of the target object to the entire captured image data is large enough to accurately recognize the shape, motion and so forth of the object and that the motion of the target object is fast. At this time, the captured region need not be limited, so that the captured region is set back to the whole capturable range (all) (steps S17 and S18).

When the captured region A is already "all," the flow returns to step S2 to resume the image capturing operation (step S17).

Figure 2:
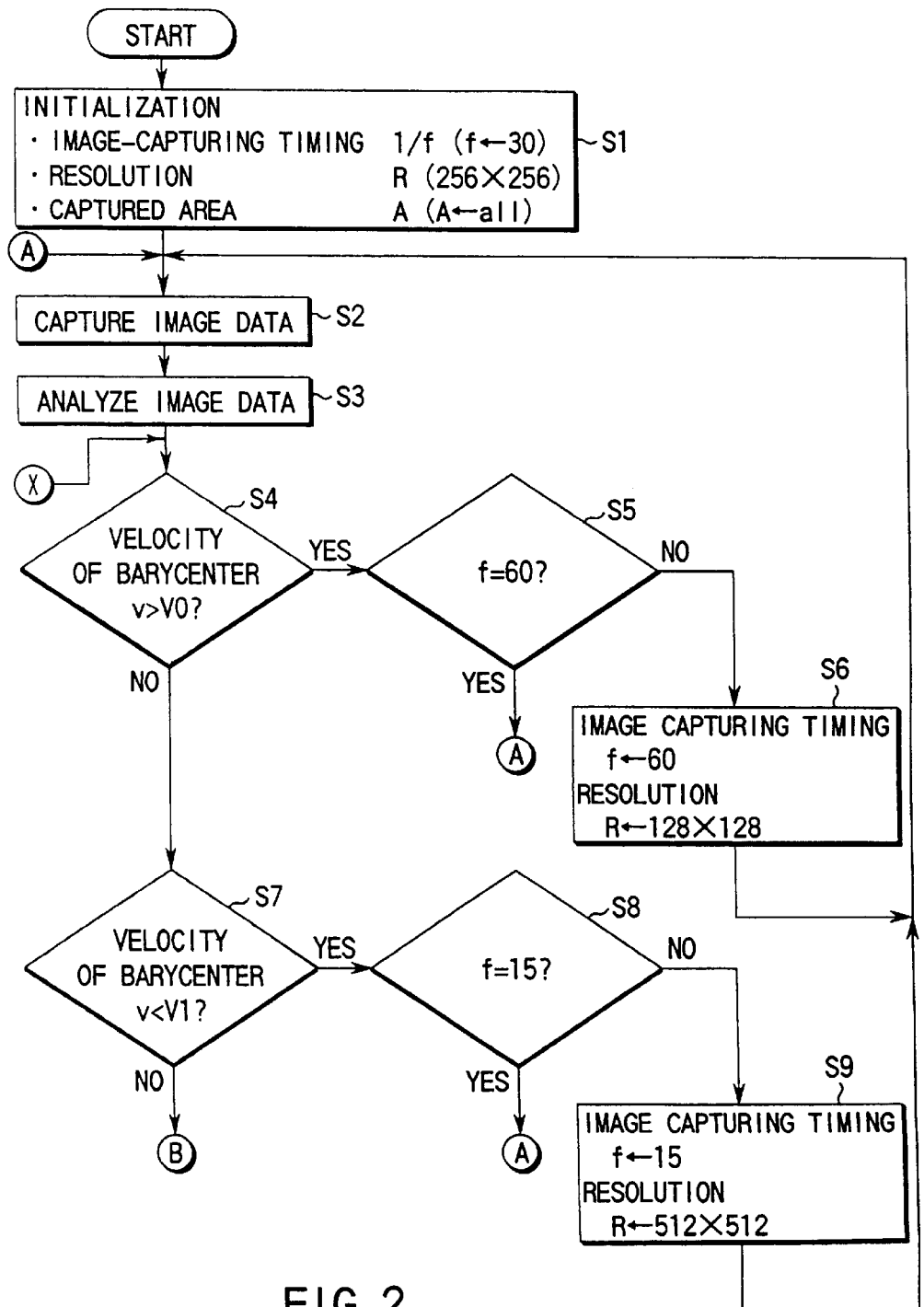
FIG. 2 is a flowchart for explaining the operation of the image processing apparatus in FIG. 1.
Figure 3:
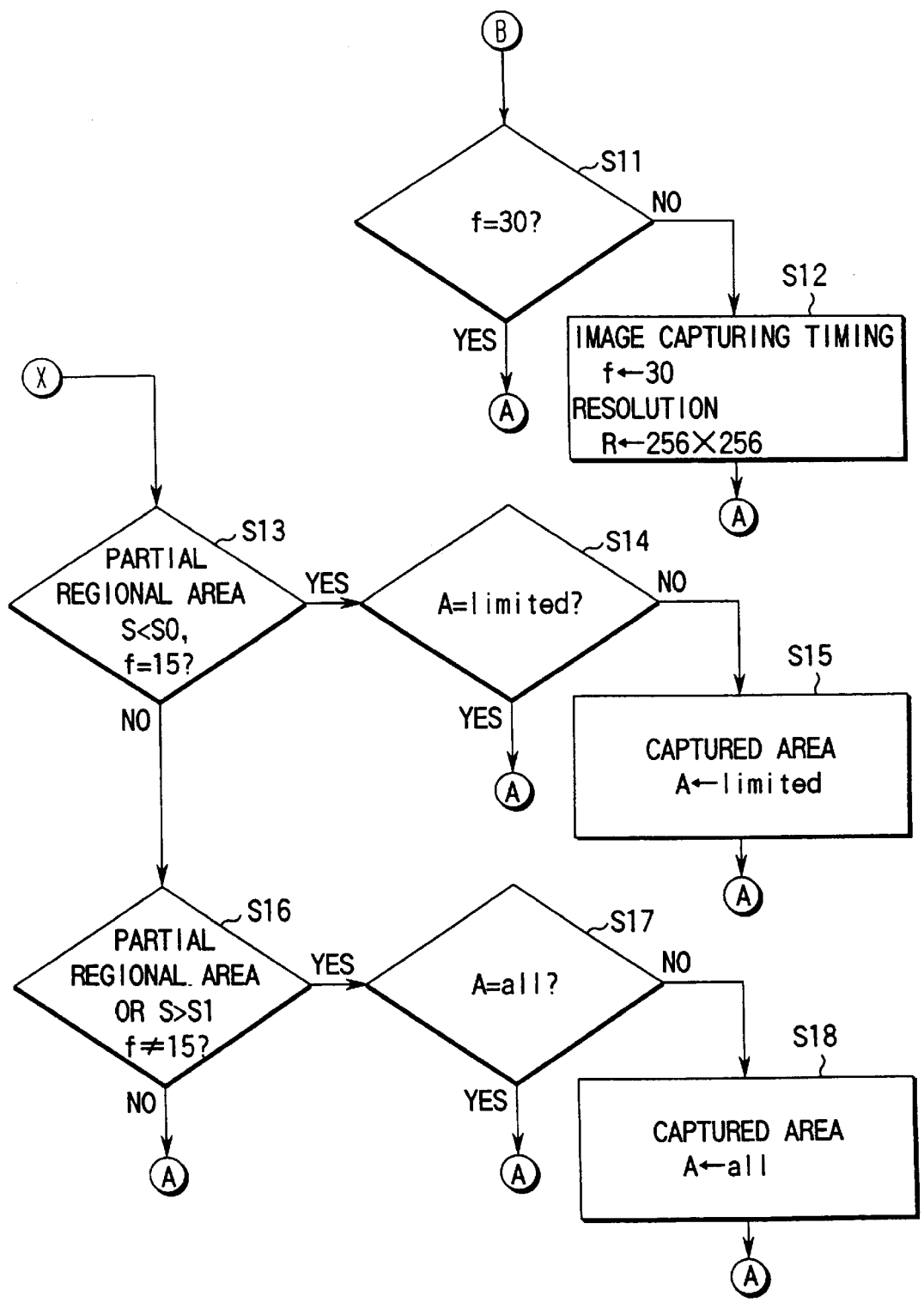
FIG. 3 is a flowchart for explaining the operation of the image processing apparatus in FIG. 1.

As the image capturing parameters are altered in accordance with the characteristics of image data of an object to be processed by performing the processes illustrated in the flowcharts in FIGS. 2 and 3, the image processing section 2 can accurately and easily analyze the motion of the target object based on the captured image data, obtained by the image capturing section 1, in response to a variation in the characteristics of the image data of the target object, even when the variation is large.

The image processing apparatus according to this embodiment, when connected to an external unit such as a personal computer or a game machine, can be used as an input device like an existing mouse for such an external unit. In this case, the image processing section 2 converts data of image processing results to the format that is accepted by the connected external unit. The external unit can thus handle the recognition results output from the image processing apparatus of this embodiment like instruction data to be input from an input device such as a conventional mouse. When the image processing apparatus of this embodiment is connected to an external unit and is used as an input device to the external unit, the image processing apparatus may send out captured image data as well as the results of recognition of the image data of an object to be processed.

According to the first embodiment, as described above, the motion image capture 1a captures image data based on preset image capturing parameters, the image processing section 2 computes the characteristics of the image data captured by the motion image capture 1a (e.g., the velocity of barycenter of an object to be processed and the ratio of the region of the target object to the entire captured image data), alters the image capturing parameters of the motion image capture 1a based on the characteristics, and then captures the captured image data of the target object based on the altered parameters. The image processing section 2 can therefore carry out image processing (analysis, recognition and so forth of the captured image data) which is responsive to changes in the shape and motion of the target object (without sacrificing the precision and the real-time response). When the target object is a user's hand, for example, the image capturing timing and resolution and the region of the hand are so altered as to be responsive to the moving speed of the hand, so that efficient and accurate image processing (analysis, recognition and so forth of the captured image data) suitable for the user's intention of the direct manipulation by the user can be implemented with a very low-cost structure as compared with the conventional image processing.

Although the foregoing description has been given of the case where the image capturing timing, the resolution and an captured region are changed in accordance with the velocity of barycenter of an object to be processed and/or the area of the region of the target object, this embodiment should not necessarily be limited to this case. For example, the velocity may be a velocity at the closest point, not the velocity of barycenter. The parameters for capturing image data, which are to be altered, may include brightness and depth in addition to the image capturing, the resolution and the captured region.

Second Embodiment

FIG. 5 schematically exemplifies the structure of an image processing apparatus according to the second embodiment of this invention. This image processing apparatus comprises an image capturing section 11, constituted of, for example, a CCD camera or CMOS camera, and an image processing unit 12, which analyzes image data (captured image data) captured by the image capturing section 1, and computes the barycenter, the area, the velocity of barycenter, etc. of a captured object, based on a density distribution, color histogram and so forth.

The image capturing section 11 comprises motion image capturing means, such as a CCD camera or CMOS camera, for capturing image data of an object to be processed.

The image processing unit 12 comprises an image processing section 12a, which mainly performs analysis on captured image data and outputs the characteristics of the captured image data, and a parameter setting section 12b which sets image processing parameters for analysis of the captured image data in the image processing section 12a, based on the characteristics computed by the image processing section 12a.

The image processing apparatus according to the first embodiment causes the image processing section 2 to supply alteration data to the image capturing section 1 to alter the image capturing parameters, such as the image capturing timing and resolution of the image capturing section 1, and the captured image data. According to the image processing apparatus of the second embodiment, alteration data which is generated as a result of analyzing captured image data in the image processing unit 12, is used in changing the parameters of the image processing section 12a. Specifically, the image processing apparatus illustrated in FIG. 5 can execute image processing (analysis, recognition and so forth of the captured image data) which is responsive to changes in the shape and motion of an object to be processed (without sacrificing the precision and the real-time response) by altering the image processing parameters, such as the image processing timing and processing functions, based on the characteristics of the captured image data.

For instance, the image processing unit 12 makes such setting as not to carry out a process of a relatively large load, such as edge extraction from the captured image data, in the normal image processing, and when the target object is a user's hand, for example, whose motion is slow, edge extraction is performed and the processing function itself is switched from one to another so that the shape of the user's hand can be recognized accurately.

The image processing unit 12, when connected to an external unit such as a personal computer or a game machine, can be used as an input device like an existing mouse for such an external unit. The analysis result and captured image data, which are output from the image processing section 12a, are sent to the external unit.

Referring now to flowchart illustrated in FIG. 6, the operation of the image processing apparatus in FIG. 5 will be explained. Before starting the operation, the parameter setting section 12b initializes image capturing parameters (step S101). For example, an image capturing timing 1/f Hz (f: the number of frames of image data to be captured per second) is set to f=30. This value is the same as the frame number of an ordinary video movie. A processing function F indicates the number of processing functions to be executed by the image processing section 12a, and is set, as an initial value, to a half the total number of processing functions. The half of the processing functions do not include a heavy-load process like edge extraction.

With those initial values set, the image capturing section 11 starts capturing image data (step S102). The image data captured (captured image data) is output to the image processing unit 12 in the form as shown in FIG. 4.

The image processing unit 12 analyzes captured image data output from the image capturing section 1, and computes characteristics, such as the barycenter of captured image data of an object (e.g., a human hand) to be processed, the area thereof, the velocity of barycenter (step S103). As this analysis scheme is the same as that of the conventional image processing and is well known, its description will not be given. Based on the characteristics computed in step S103, a sequence of processes starting at step S104 is a determining process for altering the image capturing parameters.

As a result of analyzing obtained image in step S103, when the object to be processed has a predetermined shape, the steps of S104 and the following are performed (the parameters are changed based on the motion of the object). On the other hand, when the object to be processed is not represented by the predetermined shape, the processing timing is changed (f←15) and the control returns to step S102.

The velocity of barycenter v is compared with a specified value V0 (with one screen whose sides have lengths of 30 cm, for example, V0=30 cm×f(+30)=900 cm/sec which is approximately 10 m/sec) (step S104). When the velocity of barycenter v is greater than the specified value V0, it can be considered that the hand or the target object is moving too fast for the image processing of the image processing section 12a to follow up the motion of the hand at a rate of 30 frames per second. In this case, the parameter setting section 12b of the image capturing section 1 is allowed to perform a process of setting the image capturing timing faster (steps S105 and S106). In step S106, the frame number f of image data to be captured per second is altered to 60, updating the image capturing timing, as per the first embodiment.

Manipulation with a fast moving hand implies that a fast action is important and the shape of the hand is not so significant. In step S106, therefore, a process unnecessary for image processing of an object which moves fast, such as analysis on the shape of the hand, is eliminated to ensure image processing at a rate of 60 times per second. Here, the processing function F is limited to the number of only processing functions resulting from excluding unnecessary functions from a half the total processing functions (F=limited). This specifies only those processes for extracting motion, reducing the computation load.

When the parameter setting section 12b sets the parameters (processing timing and processing function) that permit follow-up of the fast hand motion based on parameter alteration data sent from the image processing section 12a in step S106, the parameter setting section 12b returns to step S102 to resume the image capturing operation. When the flow comes to step S104 again, the processing timing f has already been set to "60," so that it is redundant to repeat the same setting in step S106. To avoid this redundancy, it is determined in step S105 if f has already been set to the fast processing timing. When the setting has been done, the flow skips step S106 and returns to step S102 to resume the image capturing operation.

The processing timing and the processing function are changed in this way in step S104 to S106 in such a way as to be able to effect image processing when a hand is moving faster than normal.

When a hand is moving slower than the normal speed or is hardly moving, it is efficient to increase the resolution of captured image data and perform a process which has emphasis on recognition of the shape of the hand. A determining process for this case is illustrated in steps S107 to S109.

The velocity of barycenter v is compared with a specified value V1 (for example, 10 cm/sec). When the velocity of barycenter v is lower than the specified value V1, it can be considered that the motion of the hand or the target object is slow (it may be considered that the user wants a direct manipulation based on the shape of the hand, like sign language). Because precise shape recognition requires a heavy-load process like edge extraction, the parameter setting section 12b is permitted to carry out a process of altering the parameter for changing the processing function (steps S108 and S109). Specifically, the processing function F is altered to F=all (all the processing functions), so that all the processes the image processing section 12a has, like the edge extraction process, are performed. The execution of every process would increase the processing load, if no measure is taken to avoid it, thus making it difficult to carry out a real-time process (e.g., the process response time becomes slower). In step S109, therefore, the processing timing f is reduced to "15" to decrease the number of frames to be processed per second (to make the processing timing slower).

When the parameter setting section 12b sets the parameters (processing timing and processing function) that ensure fast and accurate recognition of the shape of the hand in step S109, the parameter setting section 12b returns to step S102 to resume the image capturing operation. When the flow comes to step S107 again, the processing timing f has already been set to "15," so that it is redundant to repeat the same setting in step S109. To avoid this redundancy, it is determined in step S108 if f has already been set to the slow processing timing. When the setting has been done, the flow skips step S109 and returns to step S102 to resume the image capturing operation.

The foregoing description has been given of a case where the image processing of the image processing unit 12 is switched between a fast mode and a slow mode depending on whether the motion of an object to be processed is fast or slow. Likewise, the image processing of the image processing unit 12 can be switched to a normal mode. A determining process for this case is illustrated in steps S110 to S112 in FIG. 6.

The velocity of barycenter v is compared with the specified values V0 and V1. When the velocity of barycenter v lies between the specified values V0 and V1 (step S110) and when the processing timing f of the image capturing section 1 is already "30," the flow returns to step S102 to resume the image capturing operation (step S111). When the processing timing f is not "30," it is set back to the initial value of "30," and the processing function F is set back to the initial value or "half." Then, the flow returns to step S102 to resume the image capturing operation (step S112).

Figure 6:
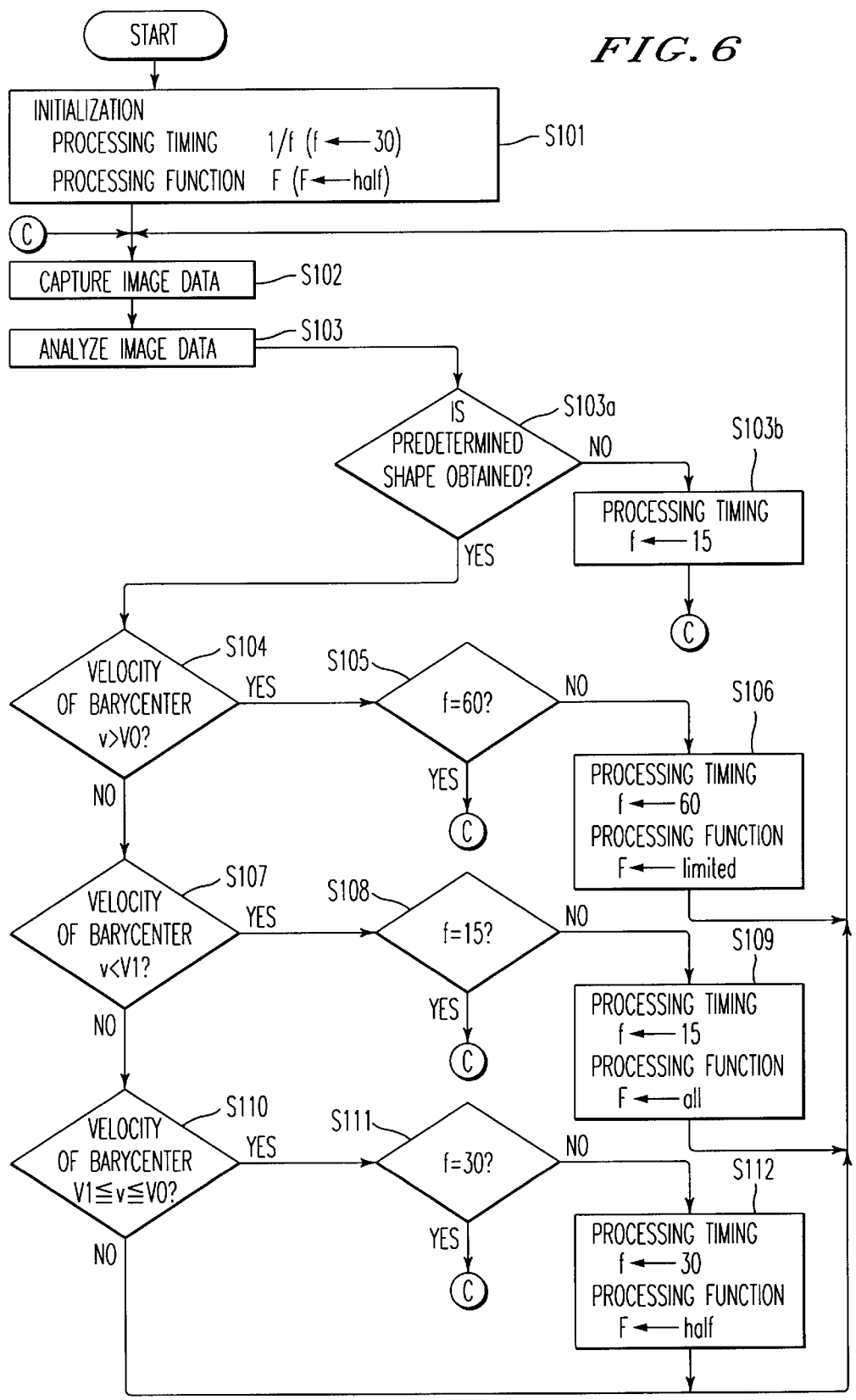
FIG. 6 is a flowchart for explaining the operation of the image processing apparatus in FIG. 5.

As the image processing parameters are altered in accordance with the characteristics of image data of an object to be processed by performing the processes illustrated in the flowchart in FIG. 6, the image processing unit 12 can accurately and easily analyze the motion of the target object based on the captured image data, obtained by the image capturing section 11, in response to a variation in the characteristics of the image data of the target object, even when the variation is large.

The image processing apparatus according to this embodiment, when connected to an external unit such as a personal computer or a game machine, can be used as an input device like an existing mouse for such an external unit. In this case, the image processing section 12a converts data of image processing results to the format that is accepted by the connected external unit. The external unit can thus handle the recognition results output from the image processing apparatus of this embodiment like instruction data to be input from an input device such as a conventional mouse.

According to the second embodiment, as described above, the image capturing section 11 captures image data, the image processing section 12a computes the characteristics of the image data captured by the motion image capture 1a (e.g., the velocity of barycenter of an object to be processed) based on preset image processing parameters, and alters the image processing parameters in such a way as to change the load on the image processing section 12a in accordance with the characteristics. It is therefore possible to carry out image processing (analysis, recognition and so forth of the captured image data) which is responsive to changes in the shape and motion of the target object (without sacrificing the precision and the real-time response). When the target object is a user's hand, for example, the processing timing and processing functions are so altered as to be responsive to the moving speed of the hand, so that efficient and accurate image processing (analysis, recognition and so forth of the captured image data) suitable for the user's intention of the direct manipulation by the user can be implemented with a very low-cost structure as compared with the conventional image processing.

Although the foregoing description has been given of the case where the image processing timing and processing functions are changed in accordance with the velocity of barycenter of an object to be processed and/or the area of the region of the target object, this embodiment should not necessarily be limited to this case. For example, the velocity may be a velocity at the closest point, not the velocity of barycenter. The image processing parameters may include a one for limiting the region of image data to be processed to a specific region in the captured image data, or a one for designating whether or not digitization of the pixel values of the captured image data should be performed to reduce the amount of processing.

Third Embodiment

An image processing apparatus shown in FIG. 7 comprises the image capturing section 1 of the first embodiment and the image processing unit 12 of the second embodiment. Like or same reference numerals are given to those components which are the same as the corresponding components in FIGS. 1 and 5, and only the difference will be discussed below. The image processing apparatus shown in FIG. 7 computes the characteristics of captured image data by means of the image processing section 12a and alters the image processing parameters and the image capturing parameters based on the characteristics.

The advantages of the image processing apparatus according to the third embodiment are the same as those of the first and second embodiments.

Fourth Embodiment

The image processing apparatuses of the first to third embodiments alter the image capturing operation and the image processing system based on the characteristics of captured image data, thereby ensuring a real-time process which matches with a user's intention. The mechanism of altering those systems may lead to a cost increase. In such a case, the above-described system alteration cannot be employed, disabling process alteration to the one that is adapted to external conditions. An image processing apparatus shown in FIG. 8 is designed to overcome this shortcoming. This embodiment is effective when the image processing section has an insufficient processing performance.

The image processing apparatus shown in FIG. 8, like the above-described image processing apparatuses, comprises an image capturing section 31, constituted of, for example, a CCD camera or CMOS camera, an image processing section 33, which analyzes image data (captured image data), captured by the image capturing section 31, and computes the barycenter, the area, the velocity of barycenter, etc. of a captured object, based on a density distribution, color histogram and so forth, and an image editing unit 32 connected between the image capturing section 31 and the image processing section 33. The image editing unit 32 comprises an image editing section 32a for mainly performing image processing, like thinning, of captured image data, and a parameter setting section 32b which sets image editing parameters necessary when the image editing section 32a executes an image editing process.

With this structure, when the processing performance of the image processing section 33 cannot cope with image processing at a rate of 60 frames per second while the image capturing section 31 is capturing image data at this rate, the image editing unit 32 processes the captured image data by performing, for example, a thinning process, and provides the image processing section 33 with the processing result, thus allowing real-time image processing to be maintained.

The image processing unit 12, when connected to an external unit such as a personal computer or a game machine, can be used as an input device like an existing mouse for such an external unit. The analysis result and captured image data, which are output from the image processing section 33, are sent to the external unit.

Referring now to flowcharts illustrated in FIGS. 9 and 10, the operation of the image processing apparatus in FIG. 8 will be discussed. Before starting the operation, the parameter setting section 32b initializes image editing parameters (step S201).

Assume that the image capturing timing of the image capturing section 31 is set to a rate of 60 frames per second, and the resolution to 512×512. The image editing unit 32 normally transfers image data to the image processing section 33 at a rate of 30 frames per second (transmission timing 1/f Hz), the resolution R of the transferred image, data is 256×256, and a transmission region A is the whole captured image data (all). Those are initially set. In the normal mode of the image editing unit 32, only every other frame sent from the image capturing section 31 as captured image data has its resolution reduced to ¼ and is sent to the image processing section 33. This is just one example, and the initial setting should not necessarily be limited to the above. The operation in normal mode may be modified in such a manner that 60 frames may be transmitted per second at the resolution of 512×512, i.e., captured image data sent from the image capturing section 31 may be transmitted, unprocessed, to the image processing section 33. The key point is that when the capturing performance of the image capturing section 31 is not balanced with the processing performance of the image processing section 33, the image editing unit 32 intervenes to keep them balanced.

Based on those initial values, the image capturing section 31 starts capturing image data (step S202). The image data captured (captured image data) is output to the image processing section 33 via the image editing unit 32 in the form as shown in FIG. 4.

The image processing section 33 analyzes captured image data output from the image editing unit 32, and computes characteristics, such as the barycenter of captured image data, the area thereof, the velocity of barycenter (step S203). As this analysis scheme is the same as that of the conventional image processing and is well known, its description will not be given. Based on the characteristics computed in step S203, a sequence of processes starting at step S204 is a determining process for altering the image editing parameters.

The velocity of barycenter v is compared with a specified value V0 (with one screen whose sides have lengths of 30 cm, for example, V0+30 cm×f(+30)=900 cm/sec which is approximately 10 m/sec) (step S204). When the velocity of barycenter v is greater than the specified value V0, it can be considered that the hand or the target object is moving too fast for the image processing of the image processing section 33 to follow up the motion of the hand even if captured image data is sent from the image editing unit 32 at a rate of 30 frames per second. Therefore, the parameter setting section 32b of the image editing unit 32 is allowed to perform a process of setting the image transmission faster (steps S205 and S206). In step S206, the transmission timing is altered by, for example, changing the number of frames to be transmitted to the image processing section 33 per second to 60.

Alteration of the number of frames to be transmitted per second from 30 to 60 means that the amount of image data to be transmitted per second becomes double. This would increase the amount of processing, if no measure is taken to avoid such, making real-time processing difficult to accomplish. In step S206, therefore, the resolution of image data to be transmitted is reduced in an inverse proportion to the alteration of the transmission timing. In this example, the resolution R originally of 256×256 is reduced to 128×128. Manipulation with a fast moving hand implies that a fast action is important and the shape of the hand is not so significant, so that lowering the resolution will not interfere with recognition and discrimination of an instructional manipulation which is effected by a user moving his or her hand. Actually, the process of recognizing the motion of the user's hand can be implemented in response to the motion of the user's hand, so that a process response time to the instructional manipulation effected by the motion of the user's hand can be prevented from becoming slower.

When the parameter setting section 32b of the image editing unit 32 sets the parameters (transmission timing and transmission resolution) that permit follow-up of the fast hand motion based on parameter alteration data sent from the image processing section 33 in step S206, the parameter setting section 32b returns to step S202 to continue the image capturing operation. At this time, the image editing parameters (transmission timing and resolution) have been changed to match the fast hand motion. The image editing section 32a therefore edits the image data, captured by the image capturing section 31, to image data suitable for fast processing, and then transfers the edited image data to the image processing section 33. When the flow comes to step S204 again, the transmission timing f has already been set to "60," so that it is redundant to repeat the same setting in step S206. To avoid this redundancy, it is determined in step S205 if f has already been set to the fast transmission timing. When the setting has been completed, the flow skips step S206 and returns to step S202 to resume the image capturing operation.

When a hand is moving slower than the normal speed or is hardly moving, it is efficient to increase the resolution of captured image data and perform a process which has emphasis on recognition of the shape of the hand. A determining process for this case is illustrated in steps S207 to S209.

The velocity of barycenter v is compared with a specified value V1 (for example, 10 cm/sec). When the velocity of barycenter v is lower than the specified value V1, it can be considered that the motion of the hand or the target object is slow (it may be considered that the user wants a direct manipulation based on the shape of the hand, like sign language). Therefore, the parameter setting section 32b of the image editing unit 32 is permitted to carry out a process of altering the transmission resolution R to such a high resolution as to ensure shape recognition with high precision (steps S208 and S209). For instance, the resolution R is changed to 512×512 from 256×256. This high resolution increases the amount of captured image data by a factor of four, increasing the amount of processing. This makes real-time processing difficult to implement. In step S209, therefore, the number of frames f to be captured per second is reduced to 15 from the ordinary number of 30 to limit the increase in the entire amount of processing to a double. This can ensure high precision recognition of the shape of the user's hand, thus permitting a real-time response to the instructional manipulation that is based on the shape of the user's hand.

When the parameter setting section 32b sets the parameters (transmission timing and transmission resolution) that ensure fast and accurate recognition of the shape of the hand in step S209, the parameter setting section 1b returns to step S202 to continue the image capturing operation. When the flow comes to step S207 again, the transmission timing f has already been set to "15," so that it is redundant to repeat the same setting in step S209. To avoid this redundancy, it is determined in step S208 if f has already been set to the slow transmission timing. When the setting has been completed, the flow skips step S209 and returns to step S202 to resume the image capturing operation.

The foregoing description has been given of a case where the image editing operation of the image editing unit 32 is switched between a fast mode and a slow mode depending on whether the motion of an object to be processed is fast or slow. Likewise, the image editing operation of the image editing unit 32 can be switched to a normal mode. A determining process for this case is depicted in steps S210 to S212 in FIG. 10.

The velocity of barycenter v is compared with the specified values V0 and V1. When the velocity of barycenter v lies between the specified values V0 and V1 (step S210) and when the transmission timing f of the image editing unit 32 is "30," the flow returns to step S202 to resume the image capturing operation (step S211). When the transmission timing f is not "30," it is set back to the initial value of "30" and the transmission resolution R is also set back to the initial value of "256×256" after which the image capturing operation is resumed (step S212).

A description will now be given of alteration of a transmission region. The area s of the region of an object to be processed in the edited image data sent from the image editing unit 32 is compared with a specified value S0 of a predetermined area with respect to the area of the edited image data, and then the transmission timing f is compared with "15," the value of the transmission timing when the motion of the target object is slow (step S213). When the area s of the region of the target object is smaller than the specified value S0 and the value of the transmission timing f is "15," it can be considered that the ratio of the target object to the entire edited image data is so small as to make it difficult to accurately recognize the shape, motion and so forth of the object and that the motion of the target object is slow. At this time, the region of captured image data to be transmitted to the image processing section 33 (transmission region) is limited to a region where the target object can exist in order to improve the efficiencies of recognition and image capturing of the target object (step S215). That is, a transmission region A is set smaller than the current transmission region (limited). When the transmission region A has already become a limited region, the flow skips step S215 and returns to step S202 to resume the image capturing operation (step S214).

The area s of the region of the object to be processed in the edited image data sent from the image editing unit 32 is compared with a specified value S1 of a predetermined area with respect to the area of the edited image data, and the transmission timing f of the edited image data is compared with "15," the value of the image capturing timing when the motion of the target object is slow (step S216). When the area s of the region of the target object is larger than the specified value S1 (S1 is a value set to four times the value of S0 when the motion captured region with the captured region A being limited is, for example, ¼ of the capturable region) and the value of the transmission timing f is not "15," it can be considered that the ratio of the target object to the entire edited image data is large enough to accurately recognize the shape, motion and so forth of the object and that the motion of the target object is fast. At this time, the transmission region need not be limited, so that the transmission region is set back to the whole capturable or the entire captured image data (all) (steps S217 and S218). When the transmission region A is already "all," the flow returns to step S202 to resume the image capturing operation (step S217).

Figure 9:
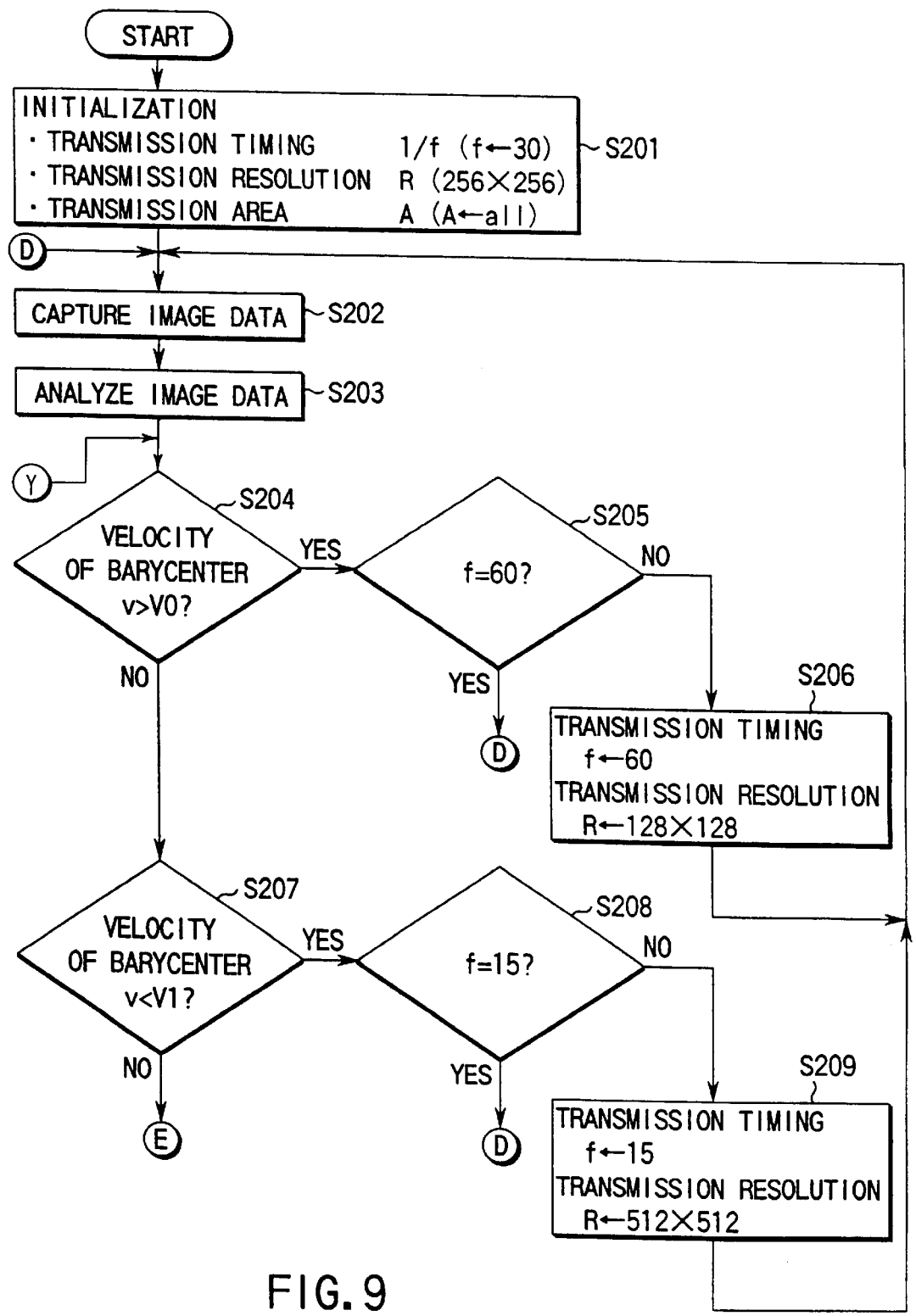
FIG. 9 is a flowchart for explaining the operation of the image processing apparatus in FIG. 8.
Figure 10:
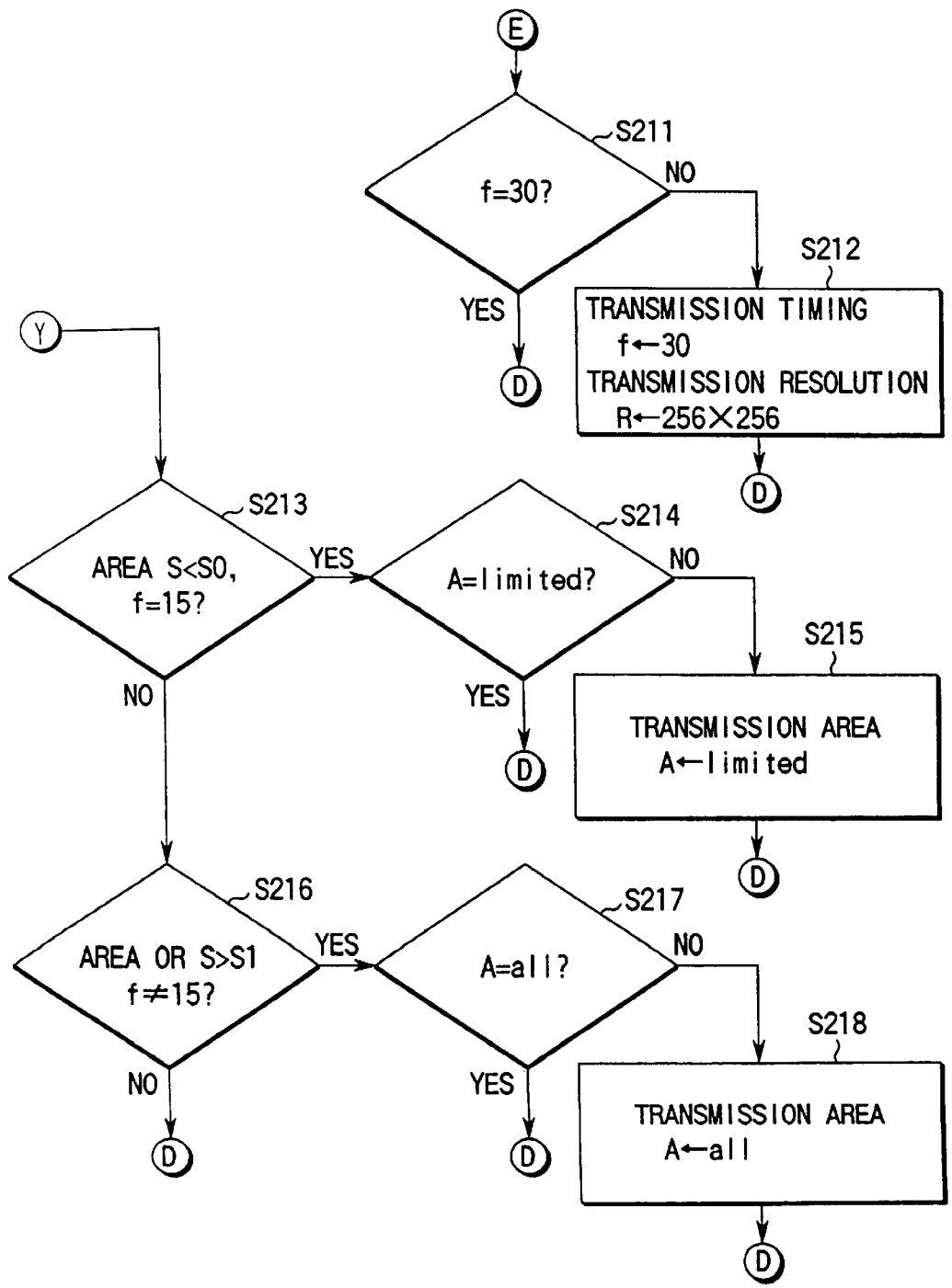
FIG. 10 is a flowchart for explaining the operation of the image processing apparatus in FIG. 8.

As the image editing parameters are altered in accordance with the characteristics of image data of an object to be processed by performing the processes illustrated in the flowcharts in FIGS. 9 and 10, the image processing section 33 can accurately and easily analyze the motion of the target object based on the captured image data, obtained by the image capturing section 31, in response to a variation in the characteristics of the image data of the target object, even when the variation is large.

The image processing apparatus according to this embodiment, when connected to an external unit such as a personal computer or a game machine, can be used as an input device like an existing mouse for such an external unit. In this case, the image processing section 2 converts data of image processing results to the format that is accepted by the connected external unit. The external unit can thus handle the recognition results output from the image processing apparatus of this embodiment like instruction data to be input from an input device such as a conventional mouse. When the image processing apparatus of this embodiment is connected to an external unit and is used as an input device to the external unit, the image processing apparatus may send out captured image data as well as the results of recognition of the image data of an object to be processed.

According to the fourth embodiment, as described above, the image capturing section 31 captures image data, the image editing unit 32 edits the captured image data based on the preset image editing parameters (the transmission timing, transmission resolution, transmission region, etc. when captured image data is transmitted to the image processing section 33), the image processing section 33 computes the characteristics of the edited image data sent from the image editing unit 32 (e.g., the velocity of barycenter of an object to be processed, the ratio of the area of the region of an object to be processed to the entire edited captured image data, etc.), and alters the image editing parameters of the image editing unit 32 in accordance with the characteristics, edits the captured image data in accordance with the altered parameters and sends the resultant image data to the image processing section 33. As a result, the image processing section 33 can carry out image processing (analysis, recognition and so forth of the captured image data) which is responsive to changes in the shape and motion of the target object (without sacrificing the precision and the real-time response). When the target object is a user's hand, for example, the image editing unit 32 edits the captured image data in such a way as to be responsive to the moving speed of the hand, so that efficient and accurate image processing (analysis, recognition and so forth of the captured image data) suitable for the user's intention of the direct manipulation by the user can be implemented with a very low-cost structure as compared with the conventional image processing.

Although the foregoing description has been given of the case where the transmission timing, transmission resolution and transmission region are changed in accordance with the velocity of barycenter of an object to be processed and the size of the area of the region of the target object, this embodiment should not necessarily be limited to this case. For example, the velocity may be a velocity at the closest point, not the velocity of barycenter. The image editing parameters, which are to be altered, may include brightness and depth in addition to the transmission timing, the transmission resolution and the transmission region.

Fifth Embodiment

Figure 11:
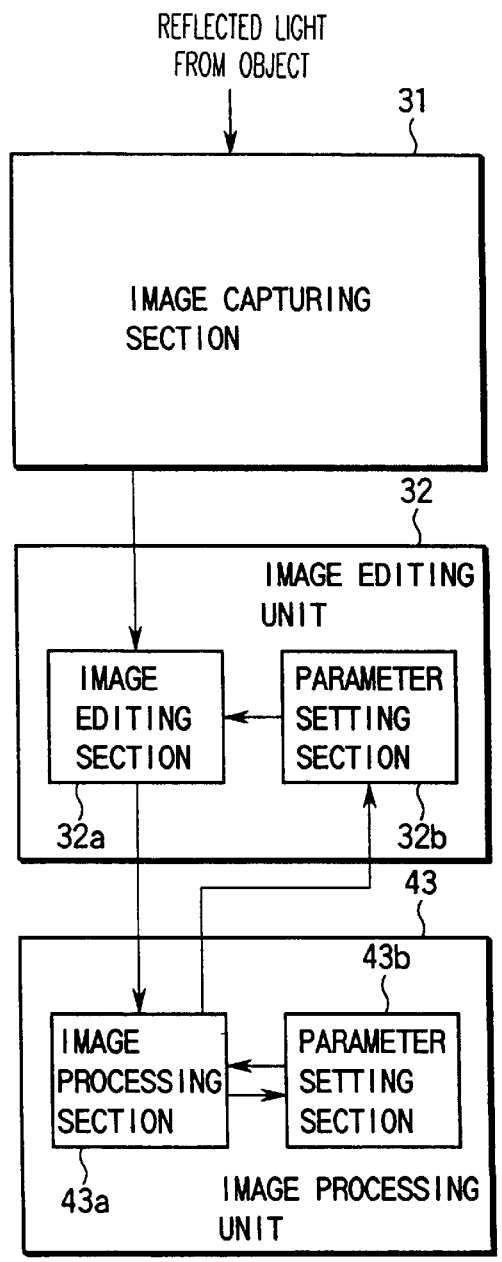
FIG. 11 is a diagram schematically exemplifying the structure of an image processing apparatus according to a fifth embodiment of this invention.

An image processing apparatus shown in FIG. 11 comprises an image processing unit 43 for performing image processing in accordance with preset image processing parameters in addition to the image capturing section 31 and the image editing unit 32 of the fourth embodiment. Like or same reference numerals are given to those components which are the same as the corresponding components in FIG. 8, and only the difference will be discussed below.

The image processing unit 43, like the image processing unit 12 shown in FIG. 5, computes the characteristics of edited image data sent from the image editing unit 32, and allows the parameter setting section 32b of the image editing unit 32 and a parameter setting section 43b of the image processing unit 43 to respectively alter the image editing parameters and the image processing parameters, based on the characteristics. The advantages of the image processing apparatus according to the fifth embodiment are the same as those provided by the fourth and second embodiments. The load of image processing as well as dissipation power can be reduced by not only editing captured image data but also changing the image processing system.

Figure 12:
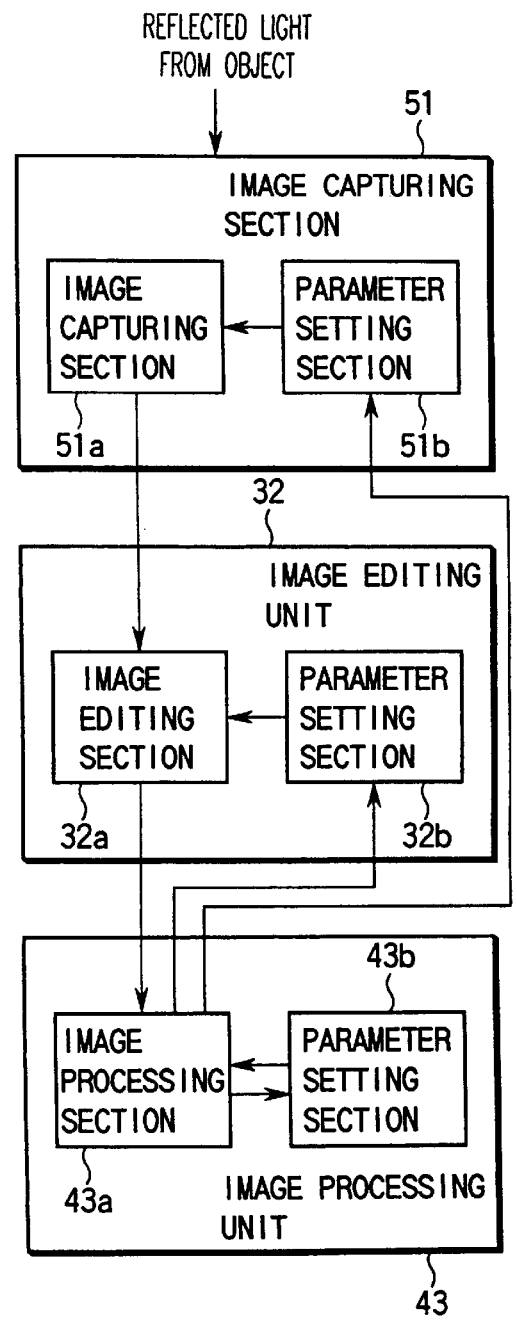
FIG. 12 is a diagram schematically illustrating another example of the structure of the image processing apparatus according to the fifth embodiment of this invention.

To reduce the dissipation power, an image processing apparatus may have a structure as shown in FIG. 12. The image processing apparatus shown in FIG. 12 comprises an image capturing section 51 for capturing captured image data according to preset image capturing parameters, and the image editing unit 32 and the image processing unit 43 shown in FIG. 11.

The image processing unit 43, like the image processing unit 12 shown in FIG. 5, computes the characteristics of edited image data sent from the image editing unit 32, and allows a parameter setting section 51b of the image capturing section 51, the parameter setting section 32b of the image editing unit 32 and the parameter setting section 43b of the image processing unit 43 to respectively alter the image editing parameters and the image processing parameters based on the characteristics.

Sixth Embodiment

An image processing methods described in the sections of the first to fifth embodiments may be stored as a computer executable program in a recording medium, such as a floppy disk, hard disk, CD-ROM or semiconductor memory, and be distributed accordingly.

Figure 13:
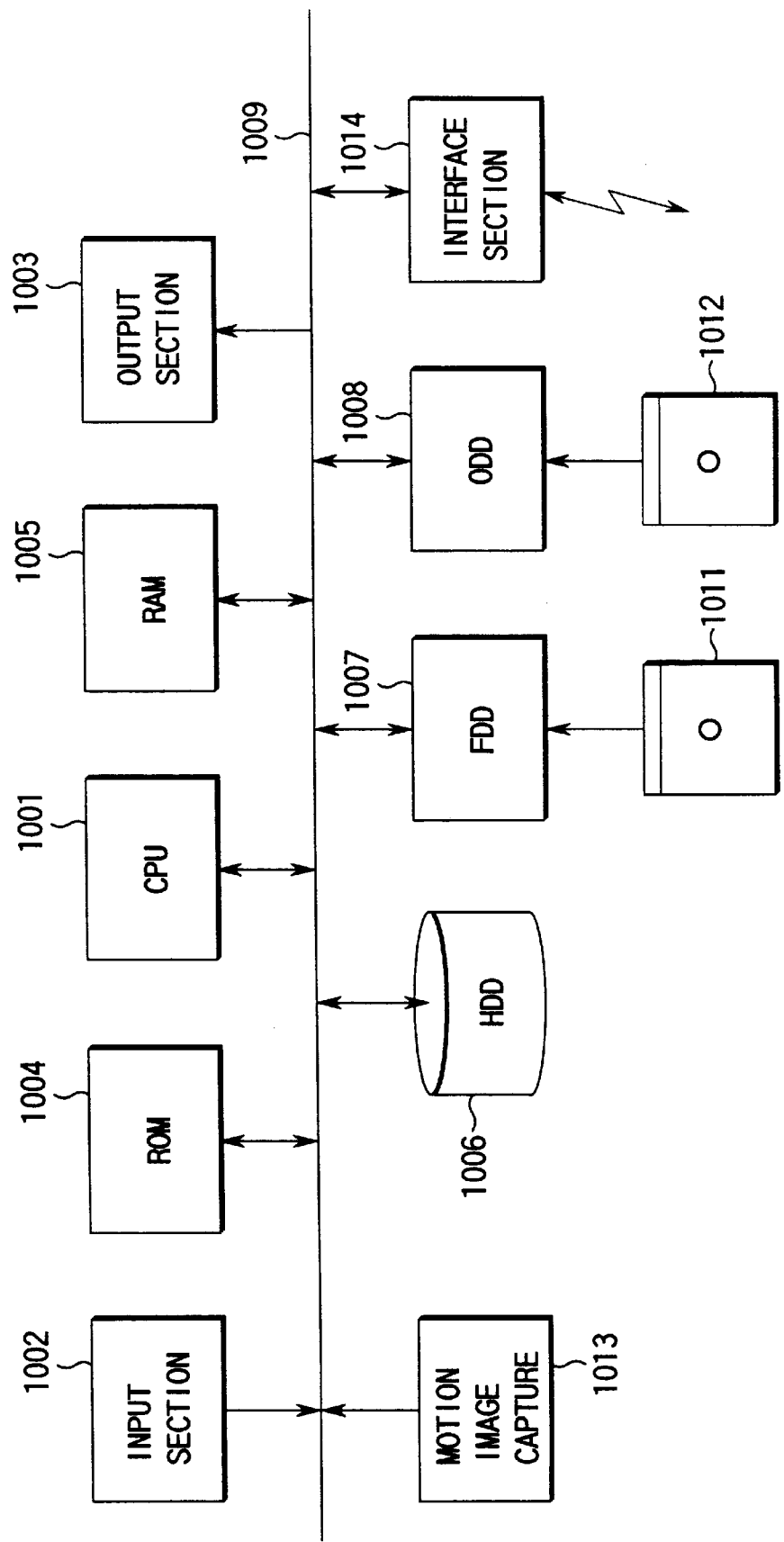
FIG. 13 is a diagram exemplifying the structure of a computer system which runs a program of an image processing method of this invention.

FIG. 13 shows the structure of a computer system for realizing the image processing method of this invention. This computer system, which may be a personal computer, comprises a CPU 1001 that preforms arithmetic operations, an input section 1002 including a keyboard, a pointing device and a mouse, an output section 1003 like a display and a speaker, a ROM 1004 and RAM 1005 as main memory, a hard disk drive 1006, a floppy disk drive 1007 and an optical disk drive 1008 as external memory units, a motion image capture 1013 comprised of, for example, a CCD camera or CMOS camera, an interface section 1014 that intervenes at the time of communication with an external unit. Those components 1001 to 1008, 1013 and 1014 are mutually connected by a bus 1009. The interface section 1014 can be constructed by USB, PCI, IEEE 1394 or the like.

A program and image data shown in FIGS. 2, 3, 6, 9 and 10, which are needed to execute the image processing method of any of the above-described embodiments, are stored on any one of the hard disk drive 1006 and recording media 1011 and 1012 respectively for the floppy disk drive 1007 and the optical disk drive 1008. In accordance with the program, processes illustrated in the flowcharts in FIGS. 2, 3, 6, 9 and 10 are performed on image data to be input from the motion image capture 1013, and the processing results (or results of, for example, analysis of the image data captured by the motion image capture 1013) are sent to the external unit via the interface section 1014. The interface section 1014 may convert the processing result data to data of the format that is acceptable by the connected external unit.

This structure can allow the image processing method of this invention to be implemented by using an ordinary personal computer, for example.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:
an image capturing unit configured to capture image data by controlling a frame rate of the image data based on a motion of the image data when a frame rate of the image data is greater than a first specified value, based on a shape of the image data when the frame rate of the image data is smaller than a second specified value, and based on both the motion and the shape when the frame rate of the image data lies between the first specified value and a the second specified value;
an image processor configured to perform predetermined image processing on said image data, captured by said image capturing unit, based on image processing parameters for determining an image processing operation; and
an alteration unit configured to alter at least one of the frame rate and said image processing parameters based on characteristics computed by said image processor.

2. An image processing apparatus comprising:
image capturing means for capturing image data;
image editing means for editing said image data, based on a motion of the image data when a frame rate of the image data is greater than a specified value, based on a shape of the image data when the frame rate of the image data is smaller than the specified value, and based on both the motion and the shape when the frame rate of the image data lies between a first specified value and a second specified value;
image processing means for performing predetermined image processing on said image data, edited by said image editing means; and
alteration means for altering said motion and shape based on characteristics computed by said image processing means.

3. An image processing apparatus comprising:
image capturing means for capturing image data by controlling a frame rate of the image data;
image editing means for editing said image data, based on a motion of the image data when a frame rate of the image data is greater than a specified value, based on a shape of the image data when the frame rate of the image data is smaller than the specified value, and based on both the motion and the shape when the frame rate of the image data lies between a first specified value and a second specified value;
image processing means for performing predetermined image processing on said image data, edited by said image editing means, based on image processing parameters for determining an image processing operation; and
alteration means for altering at least one of said frame rate, said motion and shape and said image processing parameters based on characteristics computed by said image processing means.

4. An image processing apparatus comprising:
image capturing means for capturing image data;
image editing means for editing said image data, captured by said image capturing means, based on a motion of the image data when a frame rate of the image data is greater than a specified value, based on a shape of the image data when the frame rate of the image data is smaller than the specified value, and based on both the motion and the shape when the frame rate of the image data lies between a first specified value and a second specified value;
image processing means for performing predetermined image processing on said image data, edited by said image editing means based on image processing parameters for determining an image processing operation; and
alteration means for altering at least one of said motion and shape and said image processing parameters based on characteristics computed by said image processing means.

5. An image processing method comprising the steps of:
capturing image data by controlling the frame rate of the image data based on a motion of the image data when a frame rate of the image data is greater than a specified value, based on a shape of the image data when the frame rate of the image data is smaller than the specified value, and based on both the motion and the shape when the frame rate of the image data lies between a first specified value and a second specified value;
performing predetermined image processing on said image data, captured by said image capturing step, based on image processing parameters for determining an image processing operation; and
altering at least one of said frame rate and said image processing parameters based on characteristics computed by said image processing step.

6. An image processing method comprising the steps of:
capturing image data;
editing said image data, captured by said image capturing step, based on a motion of the image data when a frame rate of the image data is greater than a specified value, based on a shape of the image data when the frame rate of the image data is smaller than the specified value, and based on both the motion and the shape when the frame rate of the image data lies between a first specified value and a second specified value;
performing predetermined image processing on said image data edited by said image editing step; and
altering said motion and shape based on characteristics computed by said image processing step.

7. An image processing method comprising the steps of:
capturing image data by controlling a frame rate of the image data;
editing said image data, captured by said image capturing step, based on image editing parameters for determining an image editing operation;
performing predetermined image processing on said image data, edited by said image editing step, based on a motion of the image data when a frame rate of the image data is greater than a specified value, based on a shape of the image data when the frame rate of the image data is smaller than the specified value, and based on both the motion and the shape when the frame rate of the image data lies between a first specified value and a second specified value; and
altering at least one of said frame rate, the motion and the shape based on characteristics computed by said image processing step.

8. An image processing method comprising the steps of:
capturing image data;
editing said image data, captured by said image capturing step, based on a motion of the image data when a frame rate of the image data is greater than a specified value, based on a shape of the image data when the frame rate of the image data is smaller than the specified value, and based on both the motion and the shape when the frame rate of the image data lies between a first specified value and a second specified value;
performing predetermined image processing on said image data edited by said image editing step based on image processing parameters for determining an image processing operation; and
altering at least one of said motion and shape and said image processing parameters based on characteristics computed by said image processing step.

9. An image processing method comprising the steps of:
capturing image data based on image capturing parameters for determining an image capturing operation;
computing characteristics including a velocity of barycenter and an area of said captured image data;
setting an image capturing timing quicker than an initial value and reducing a resolution of image data to be captured, when said computed velocity of barycenter is greater than a specified value;
setting said resolution higher than an initial value and setting said image capturing timing slower than said initial value when said computed velocity of barycenter is smaller than the specified value;
setting said image capturing timing and said resolution to the respective initial values when said computed velocity of barycenter lies between a first specified value and a second specified value;
limiting an image captured region to a smaller region than a current image captured region when an area of a region of an object to be processed is smaller than a specified value and when said image capturing timing is slower than said initial value; and
setting said image captured region back to an entire motion image capturable range when said area of said region of said object to be processed is larger than said specified value and when said image capturing timing is not slower than said initial value.

10. An image processing method comprising the steps of:

capturing image data based on image capturing parameters for determining an image capturing operation;

computing characteristics including a velocity of barycenter of said captured image data;

setting an image processing timing quicker than an initial value and limiting a processing function to be lower than an initial one, when said computed velocity of barycenter is greater than a specified value;

setting said image processing timing slower than said initial value and permitting said processing function to be greater than said initial one, when said computed velocity of barycenter is smaller than said specified value; and setting said image processing timing and said processing function to the respective initial ones when said computed velocity of barycenter lies between a first specified value and a second specified value.

11. An image processing method comprising the steps of:

capturing image data based on image capturing parameters for determining an image capturing operation;

computing characteristics including a velocity of barycenter and an area of said captured image data;

setting an image transmission timing quicker than an initial value and setting a transmission resolution of image data smaller than an initial value when said computed velocity of barycenter is greater than a specified value;

setting said transmission timing slower than said initial value and setting said transmission resolution greater than said initial value when said computed velocity of barycenter is smaller than a specified value;

setting said transmission timing and said transmission resolution to the respective initial values when said computed velocity of barycenter lies between a first specified value and a second specified value;

setting an image captured region to a region where an object to be processed can exist when an area of a region of said object to be processed is smaller than a specified value; and setting said image captured region to an entire motion image capturable range when said area of said region of said object to be processed is larger than said specified value.

12. An article of manufacture comprising:

a computer usable medium having computer readable program code means embodied therein for causing image data to be processed, the computer readable program code means in said article of manufacture comprising:

computer readable program code means for causing a computer to capture image data by controlling a frame rate of the image data based on a motion of the image data when a frame rate of the image data is greater than a specified value, based on a shape of the image data when the frame rate of the image data is smaller than the specified value, and based on both the motion and the shape when the frame rate of the image data lies between a first specified value and a second specified value;

computer readable program code means for causing the computer to effect a predetermined process on image data inputted in accordance with image processing parameters defining an image process operation; and computer readable program code means for causing the computer to alter at least one of the frame rate based on characteristics computed by the predetermined process on said image data.

13. An article of manufacture comprising: a computer usable medium having computer readable program code means embodied therein for causing image data to be processed, the computer readable program code means in said article of manufacture comprising:

computer readable program code means for causing a computer to edit image data inputted based on a motion of the image data when a frame rate of the image data is greater than a specified value, based on a shape of the image data when the frame rate of the image data is smaller than the specified value, and based on both the motion and the shape when the frame rate of the image data lies between a first specified value and a second specified value; and computer readable program code means for causing a computer to effect a predetermined process on the edited image data, in accordance with image processing parameters defining an image process operation; and computer readable program code means for causing a computer to alter at least one of the frame rate defining an operation of capturing the image data, the motion and shape, and the image processing parameters.

* * * * *